G. A. E. MELLIN.
GEAR SHIFTING LEVER.
APPLICATION FILED SEPT. 6, 1917.
1,256,244.
Patented Feb. 12, 1918.
2 SHEETS—SHEET 2.
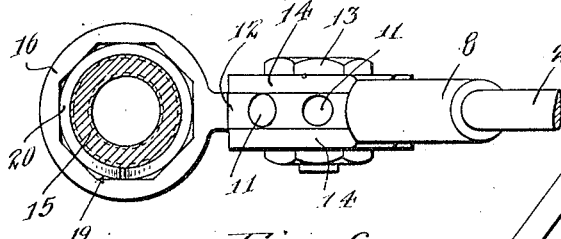
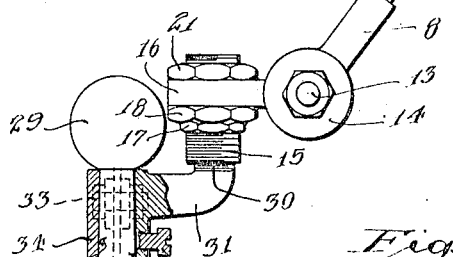
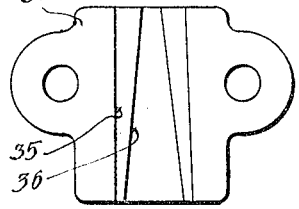
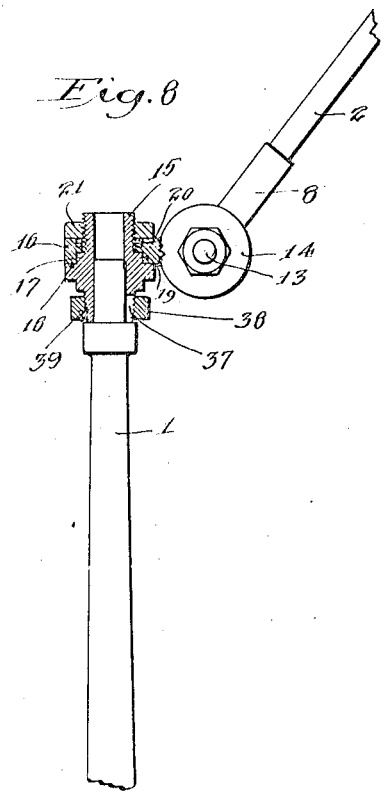
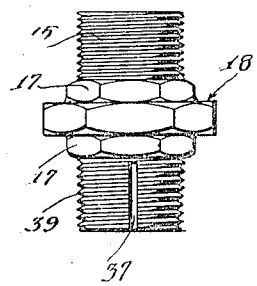
Inventor
Gustaf. A. E. Mellin

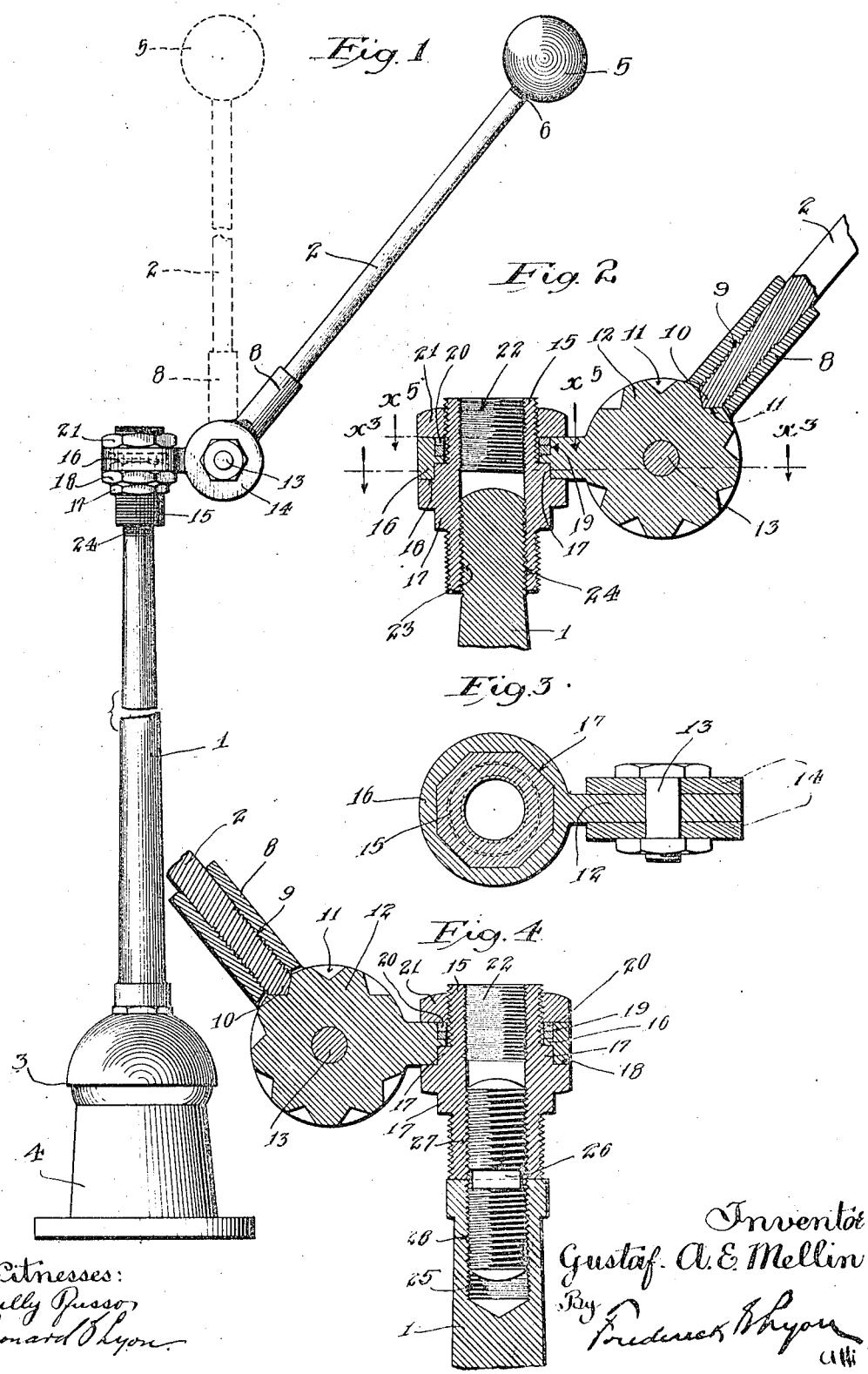

UNITED STATES PATENT OFFICE.

GUSTAF A. E. MELLIN, OF LOS ANGELES, CALIFORNIA.

GEAR-SHIFTING LEVER.

1,256,244.　　　　Specification of Letters Patent.　　Patented Feb. 12, 1918.

Application filed September 6, 1917. Serial No. 189,918.

*To all whom it may concern:*

Be it known that I, GUSTAF A. E. MELLIN, a citizen of the United States, residing at Los Angeles, in the county of Los Angeles and State of California, have invented a new and useful Gear-Shifting Lever, of which the following is a specification.

This invention relates to levers, for example, of the character designed to shift the gears in change speed mechanism such, for instance, as used on motor cars.

An object of the invention is to produce a lever of this character which is adjustable to the needs of various drivers.

Another object is to produce a lever having an extension which can be moved out of the way of the driver when desirable so as to facilitate his getting in and out of the motor car in which the device is used.

Another object is to produce a device of this character which is of relatively simple and reliable construction and of minimum liability for its parts to become disarranged.

Other objects and advantages will appear in the subjoined detail description.

The accompanying drawings illustrate the invention:

Figure 1 is a side elevation of a lever embodying the invention, a portion of the main arm being broken away to contract the view and the lever mounting also being shown. Different positions of the lever extension are shown in full and broken lines.

Fig. 2 is an enlarged sectional detail of the parts at the adjustable joint between the main arm and extension in Fig. 1.

Fig. 3 is a plan section on line indicated by $x^3$—$x^3$, Fig. 2.

Fig. 4 is an enlarged sectional detail showing a modified form of the connection between the main arm and extension.

Fig. 5 is a plan view partly in section in line indicated by $x^5$—$x^5$, Fig. 2.

Fig. 6 is a side elevation, partly in section, of another modification of the invention, the lower portion of the lever being broken away to contract the view.

Fig. 7 is an enlarged view of the clamping member shown in Fig. 6.

Fig. 8 is a side elevation, partly in section, of another modification of the invention, portions of the extension and main arm being broken away to contract the view.

Fig. 9 is an enlarged side elevation of the sleeve shown in Fig. 8.

The lever comprises a main arm 1 which may be of any of the ordinary constructions and an extension 2, the main arm 1, in the instance shown in the drawings, having a universal or ball and socket connection 3 with a base or mounting 4. The ball and socket joint is well known in the automobile art and is therefore unnecessary to show and describe in detail.

The extension 2 may be provided at its outer end with a knob or head 5 and in the instance shown said end of the extension 2 is knurled at 6, see Fig. 6, and the knob 5 is provided with a recess or socket 7 so that in assembling the knob all that is necessary is to drive the same forcibly on the knurled portion 6.

The main arm 1 and extension 2 are adjustably connected to one another so that the extension can be swung into different angular relations to the main arm and held in the adjusted position. A suitable adjustable connection will now be described. The extension 2 is rotatively seated in a socket 8 and has screw-threaded engagement at 9 with said socket as clearly shown in Figs. 2 and 4. The extension 2 is more or less pointed at its inner end to form a detent 10 which is adapted to selectively fit any one of a series of V-shaped notches 11 in the periphery of a disk 12 through which a pivot 13 in the form of a bolt passes to pivotally connect the disk 12 with furcations 14 of the socket 8. The disk 12 is adjustably mounted on a sleeve 15 so as to be capable of being turned relative to the arm 1 and for this purpose is provided with a collar 16 having a portion of its bore angular as shown in Fig. 3 so as to fit an angular portion 17 of the sleeve, said collar resting upon a shouldered portion 18 of the sleeve. Seated in an angular recess 19 in the upper end of the collar 16 is a split spring washer 20 and screw-threaded onto the upper end of the sleeve is a nut 21 adapted to be screwed down tightly against the spring washer 20 so that the nut 21 will be locked in position and will in turn hold the collar securely in place on the sleeve.

From the foregoing it is clear that the extension 2 may be given various angular adjustments, one such adjustment being shown in solid lines in Fig. 1, another in broken lines in Fig. 1, and still another in Fig. 4. It is obvious that still further adjustments may be made without change of construction. It is noted that the notches 11 on opposite sides of the disk do not come diametrically opposite to one another. Thus it is clear that when the nut 21 is removed the collar 16 may be disengaged from the sleeve and may be turned upper side down so as to change the angular relation of the notches to the axis of the arm 1 from that shown in Figs. 2 and 4.

The foregoing described construction is common to the various embodiments of the invention shown in the drawings, but the connection between the sleeve 15 and main arm 1 varies in accordance with the different requirements in practice, since the main arm 1 may be any one of various lever arms already installed in motor cars and these lever arms are variously constructed as is well known.

First considering the connection shown in Figs. 1 to 3 inclusive, it is noted that the sleeve 15 is screw-threaded externally at both ends, the screw-threads being the same at both ends so that the nut 21 will fit either end. The sleeve 15 is provided internally at one end with screw-threads 22 and at the opposite end with screw-threads 23, the screw-threads 22, 23 being of two different gages so as to fit corresponding screw-threads of two different gages on the outer end of the main arm 1 according to the requirements. Thus one end or the other of the sleeve 15 will be screwed on the main arm 1 according to the character of the external screw-threads 24 on said arm.

In some instances the main arm 1, instead of being externally threaded as in Fig. 2, is internally threaded as at 25, Fig. 4 and the screw-threads 25 may be either one of two different gages. With such construction a stud 26 is provided, said stud being screw-threaded and the screw-threads 27 at one end being of different gage from the screw-threads 28 at the other end, one for each gage of the threads 25. Thus by turning the stud 26 end for end and engaging the corresponding threaded sleeve portion therewith said stud will answer to connect the sleeve to the main arm 1 when said main arm is provided with internal threads of either of the two standards employed for the stud.

In Fig. 6 is shown a type of main arm 1 provided with an integral head or knob 29 and in this instance the sleeve 15 is screw-threaded onto a stud 30 of a bracket 31 provided with a channel 32 to approximately fit the arm 1. Fastened to the bracket 31 by bolts 33 or equivalents is a clamping member 34 provided with a channel 35 approximately fitting the arm 1. The channel 35 is provided with longitudinally extending ribs 36 forming teeth to engage the arm 1 so that when the bolts 33 are drawn up tightly relative movement between the arm 1 and bracket 31 and clamping member 34 will be prevented. Additional means may be provided to prevent relative movement between the bracket 31 and arm 1 and in the instance shown said means comprises a set-screw 37 screw-threaded through the bracket and having its inner end engaging the arm 1.

In some instances the lever arm 1, as shown in Fig. 8, is provided with a plain cylindrical end portion and with such construction the sleeve 15 will preferably be provided with a kerf 37 so that when the sleeve is slipped over the end of the arm 1 a nut 38 may be turned up tight on the tapered screw-threads 39 of the sleeve to contract the lower end thereof tightly against the upper end of the main arm 1 so as to firmly hold the sleeve in place.

Thus it is clear that by providing a stud 26, bracket 31, clamp 34 and varying the construction of the sleeve 15 slightly the extension 2 can be applied to many types of gear shifting lever arms now installed in motor cars, which is obviously of great advantage.

In practice the driver of the motor vehicle in which the device is installed will adjust the lever to his individual requirements by turning the extension 2 so as to disengage the detent 10 and he will move the extension into the desired position, whereupon he will turn the extension to bring the detent 10 into engagement with the appropriate notch 11 so as to hold the extension in the adjusted position.

When the driver desires to throw the extension 2 into such position as not to hamper his movements in getting in and out of the vehicle he will turn the extension 2 to withdraw the detent 10 from the notch 11 and either throw the extension into the position shown in Fig. 4 or swing it down close to the main arm 1 in a manner easily understood. It is clear that if the driver cannot get an adjustment to suit him with the disk 12 in the position shown in Fig. 2 said disk may be reversed as hereinbefore described so as to bring the notches 11 into different angular relations to the axis of the arm 1. It is also clear that other adjustments than permissible with the disk 12 positioned to the right of the arm 1 as in Fig. 2 may be obtained by turning the disk to position at the left of said arm as in Fig. 4.

It is understood that within the spirit and scope of the appended claims changes and modifications of construction are permissible.

I claim:

1. A gear shifting lever comprising a main arm, an extension, and means to adjustably hold the extension at different angles relative to the main arm, said means including an adjustable collar rotatively mounted on the main arm.

2. A gear shifting lever comprising a main arm, a notched member fastened to the main arm, a socket member pivoted to the notched member, and an extension mounted in the socket member and having a detent adapted to selectively engage the notches in the notched member when the extension is moved relative to the socket member.

3. A gear shifting lever comprising a main arm, a notched member reversibly mounted on the main arm, a socket member pivoted to the notched member, and an extension mounted in the socket member and having a detent adapted to selectively engage the notches in the notched member when the extension is moved relative to the socket member.

4. A gear shifting lever comprising a main arm, a sleeve having a shoulder and connected with the main arm, a notched member having a collar, means to hold the collar against the shoulder, and an extension having a detent to selectively engage the notches of the notched member.

5. A gear shifting lever comprising a main arm, a sleeve having a shoulder and connected with the main arm, a collar, a nut screw-threaded onto the sleeve to hold the collar against the shoulder, an extension, and means adjustably connecting the extension to the collar.

6. A gear shifting lever comprising a main arm, a sleeve having a shoulder and having an angular portion and connected with the main arm, a collar having a portion of its bore angular to fit the angular portion of the sleeve, means to hold the collar against the shoulder, an extension, and means adjustably connecting the extension to the collar.

7. A gear shifting lever comprising a main arm, a notched member connected with the main arm, a socket member pivoted to the notched member and provided with screw-threads, and an extension engaging the screw-threads of the socket and rotative in the socket and provided with a detent at its inner end adapted to be moved toward the appropriate notch in the notched member when the extension is turned in one direction and from said notch when the extension is turned in the opposite direction.

8. A gear shifting lever comprising a main arm, an extension hingedly connected to the main arm to allow for adjusting of the extension to different angles relative to the main arm, the hinge connection including a member rotatively adjustable into different positions around the main arm, and means to selectively hold the extension in the different positions of adjustment.

Signed at Los Angeles, California, this 31st day of August 1917.

GUSTAF A. E. MELLIN.

Witnesses:
GEORGE H. HILES,
A. F. SCHMIDTBAUER.